(No Model.)

H. W. VERDON.
PNEUMATIC TIRED WHEEL.

No. 529,001.

Patented Nov. 13, 1894.

WITNESSES:
W. H. James.
L. D. Clark.

INVENTOR.
H. W. Verdon
per Robt. Ed. Phillips
Attorney.

THE NORRIS PETERS CO., PHOTO-LITHO., WASHINGTON, D. C.

UNITED STATES PATENT OFFICE.

HENRY WALTER VERDON, OF LONDON, ENGLAND.

PNEUMATIC-TIRED WHEEL.

SPECIFICATION forming part of Letters Patent No. 529,001, dated November 13, 1894.

Application filed August 21, 1893. Serial No. 483,649. (No model.) Patented in England November 9, 1892, No. 20,205.

*To all whom it may concern:*

Be it known that I, HENRY WALTER VERDON, a subject of the Queen of Great Britain, residing at Brixton, London, in the county of Surrey, England, have invented a new and useful Improvement in Pneumatic-Tired Wheels, (for which I have obtained a patent in Great Britain, No. 20,205, bearing date November 9, 1892,) of which the following is a specification.

My invention relates to an improved method of attaching and securing the covers of pneumatic tires to wheel-rims, and it consists in forming on the divided edges of the cover beads or enlargements, and in forming in the edges of the wheel-rim channels adapted to receive the beads or enlargements on the edges of the cover, the shape of the said channels being such that when the beaded or enlarged edges of the cover are placed in the channels in the wheel rim they cannot be pulled out thereof by the pressure of air within the tire, the object being to attach and secure the cover to the wheel rim in a simple and ready manner and provide for its ready detachment therefrom. I attain this end in the manner illustrated by the accompanying drawings, in which—

Figure 1:
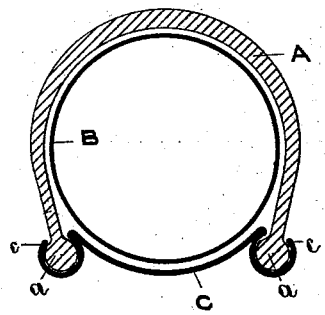
Figure 2:
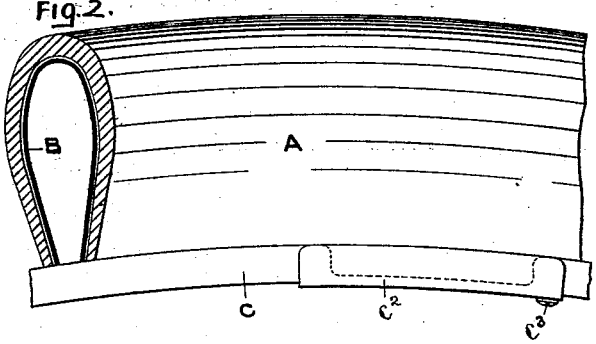
Figure 3:
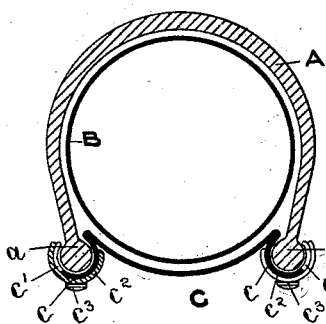
Figure 4:
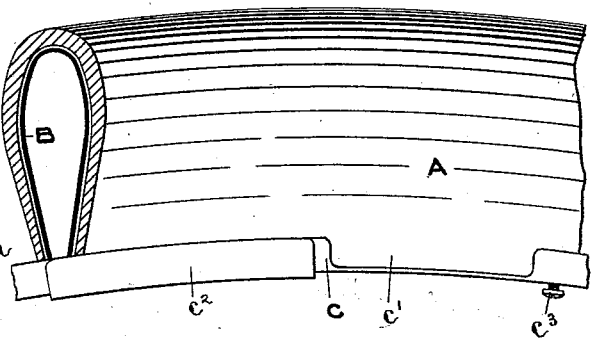
Figure 5:
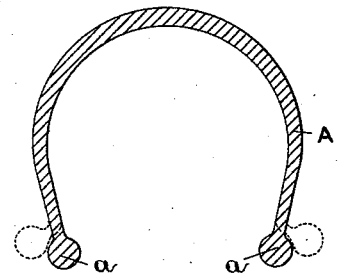
Figure 6:
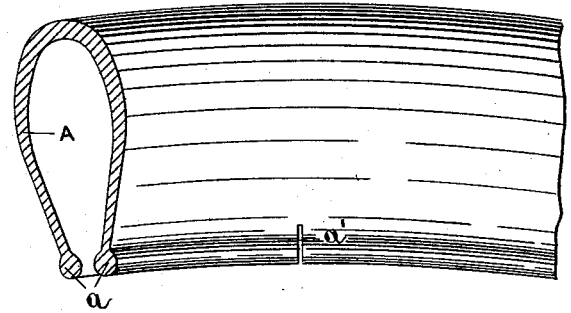
Figure 7:
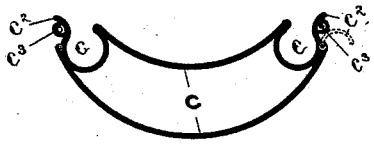
Figure 8:
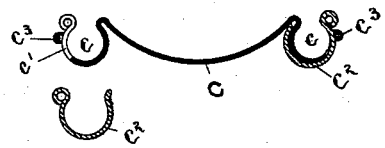

Figure 1 is a view in transverse section of a tire and wheel rim embodying my invention. Fig. 2 is a broken view in side elevation thereof showing the sliding piece closing the gap or opening in the wheel rim. Fig. 3 is a view in transverse section through the sliding pieces showing on one side thereof the gap in the rim open and on the other side thereof the gap in the rim closed. Fig. 4 is a broken view in side elevation showing the sliding piece withdrawn to open the gap in the rim. Fig. 5 is a view in transverse section of the cover of the tire showing how the beaded edges are pushed on one side at the slits when inserting the said beads or enlargements in the channels of the rim, and Fig. 6 is a broken view in side elevation of the cover of the tire showing one of the slits in the beads or enlargements on the edges thereof. Fig. 7 is a view of the rim in transverse section showing an alternative method of closing the gap in the channels of the rim for the introduction of the beaded edges of the cover, and Fig. 8 is a view in transverse section showing another method of closing the gap in the channels in the wheel rim.

Similar letters refer to similar parts throughout the several views.

The cover A of the tire is made of rubber reinforced with canvas in the well-known manner. It is molded or otherwise formed of an approximately arch-shape in cross section and it has beads or enlargements "$a$" formed on its edges. These beads or enlargements are of any suitable shape in cross section but preferably round as shown in the drawings, and they are made of a harder rubber than the other part of the cover, or are stiffened and strengthened by an insertion piece of canvas or other suitable material. Each of the beads or enlargements "$a$" are split transversely through at one or more points "$a'$" as shown by Fig. 6.

The air tube B is of the usual construction and is fitted with any suitable form of valve for inflation and deflation.

The rim C may be either of the solid type as shown by Figs. 1 and 3, or of the hollow type as shown by Fig. 7, and it has formed in its edges channels "$c$" "$c$," of a shape in cross section similar to that of the beads or enlargements "$a$" on the edges of the cover A, but slightly larger so that the said beads or enlargements can be easily and readily slid into the channels in the rim and when so engaged therewith they cannot be pulled out thereof by the pressure within the tire. To permit the beaded or enlarged edges of the cover being slid into the channels in the wheel rim one or more gaps or openings "$c'$" are cut or formed therein as shown by Figs. 2, 3, 4, 7, and 8. The gaps or openings in each channel of the rim and the slits in each of the beads or enlargements on the edges of the cover are preferably placed opposite to each other so that both edges of the cover can be slid into position in the channels in the rim at the same time.

To close the gaps or openings "$c'$" in the wheel rim sliding pieces "$c^2$" are placed over the exterior of the channels "$c$" which either close the gaps or openings as shown by Fig. 2 or open them as shown by Fig. 4, the said sliding piece being fixed in position when the gap or opening is closed by means of a screw "$c^3$" threaded into the wheel rim and engaging with a slot in the sliding piece. As an alternative the sliding piece may be made of the same length as the gap or opening in the wheel rim and be made of spring steel to spring into the said gap or opening when it is opposite to it and so preserve the width of the orifice of the channel in which case it is kept in position by means of a sliding bolt "$c^3$" as shown by Fig. 8. Another method of opening and closing the gap is to hinge a loose piece "$c^2$" to the gap or opening in the channel as shown by Fig. 7, the said hinged piece being locked in position to close the gap or opening by means of a sliding bolt "$c^3$".

To attach the cover to the wheel rim it is placed over the rim and the beads or enlargements slid into the channels thereof through the gaps or openings by pushing aside the beads or enlargements on one side of each split therein as shown by Fig. 5 and pulling the cover circumferentially round the wheel rim until its entire edges are in the channels in the edges thereof, the gaps or openings in the wheel rim being afterward closed in the manner hereinbefore described.

What I claim as my invention, and desire to secure by Letters Patent, is—

In a pneumatic tire, the combination of the cover A having beads or enlargements "$a$" "$a$" on each edge, the said beads or enlargements being split transversely at one or more places; of the air tube B provided with any suitable valve for inflation and deflation; and of the wheel rim C having channels "$c$" "$c$" at its edges, each having one or more gaps or openings "$c'$" cut or formed in it and capable of being closed by the sliding pieces "$c^2$," as and for the purpose set forth.

HENRY WALTER VERDON.

Witnesses:
W. M. HARRIS,
THOMAS LAKE.